(No Model.)  3 Sheets—Sheet 1.

E. R. SOLEAU.
HEATING APPARATUS.

No. 511,280. Patented Dec. 19, 1893.

WITNESSES:
Wm. L. Canfield, Jr.
A. No Marsh

INVENTOR:
Edward R. Soleau,
BY Fred C. Fraentzel, ATT'Y.

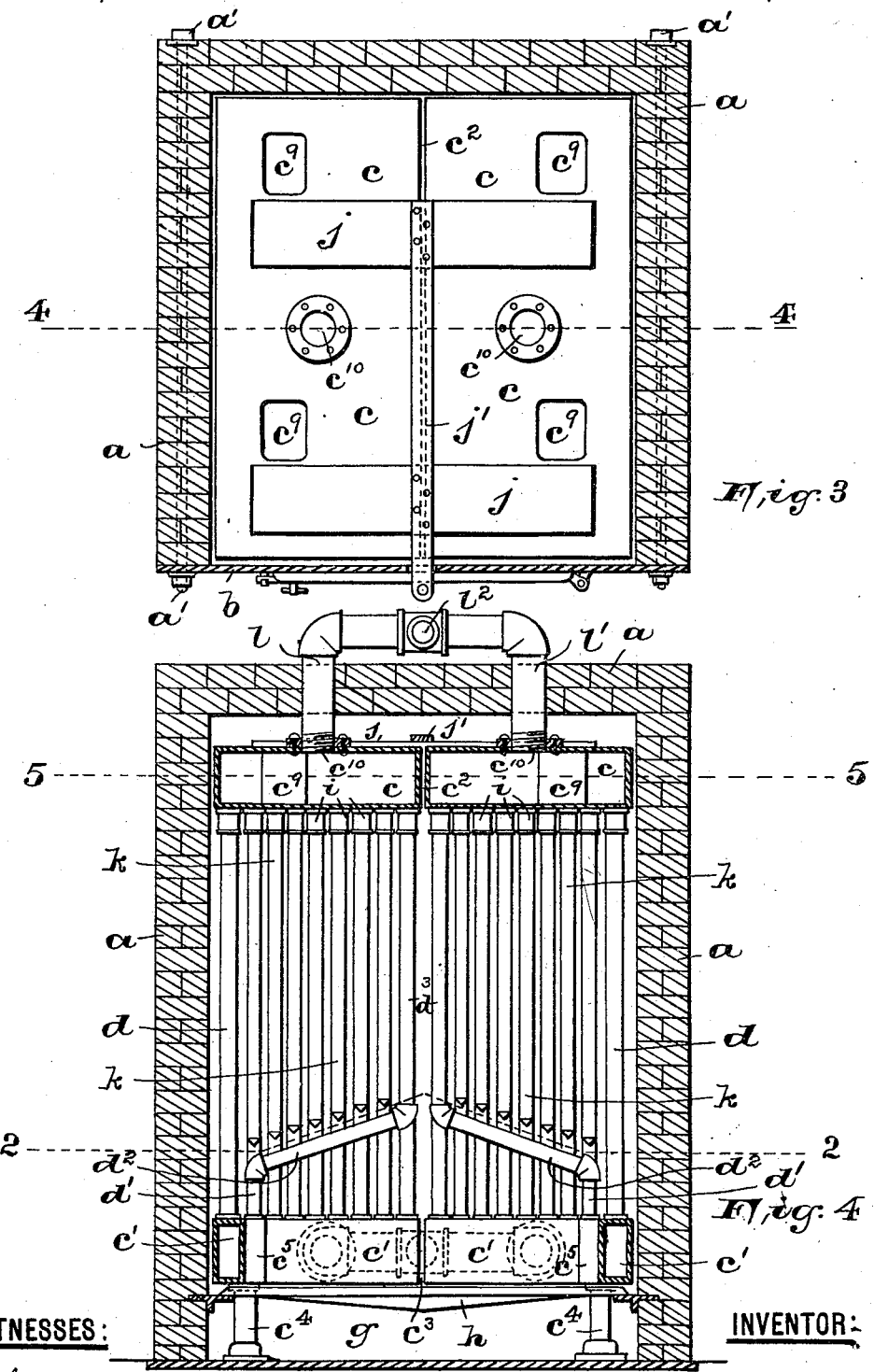

(No Model.) 3 Sheets—Sheet 3.
E. R. SOLEAU.
HEATING APPARATUS.
No. 511,280. Patented Dec. 19, 1893.
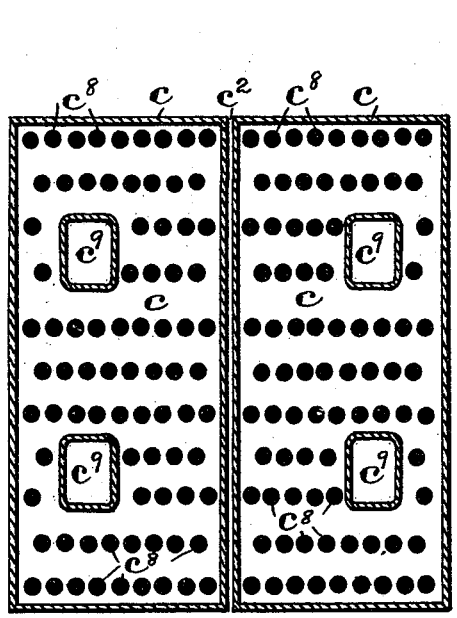
Fig. 5
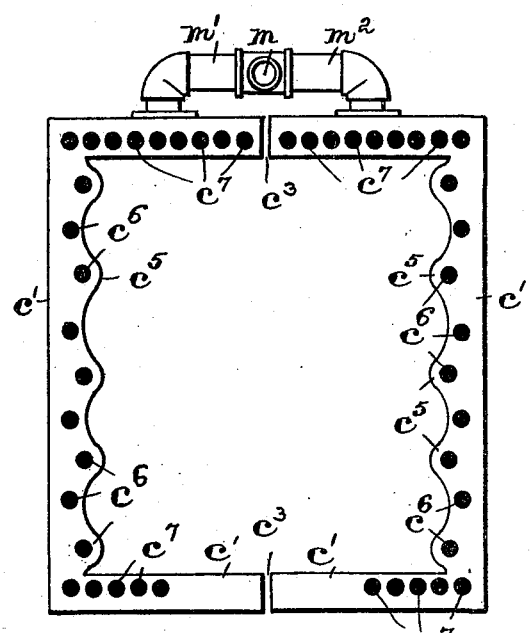
Fig. 6
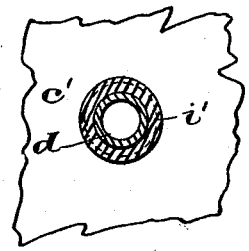
Fig. 7
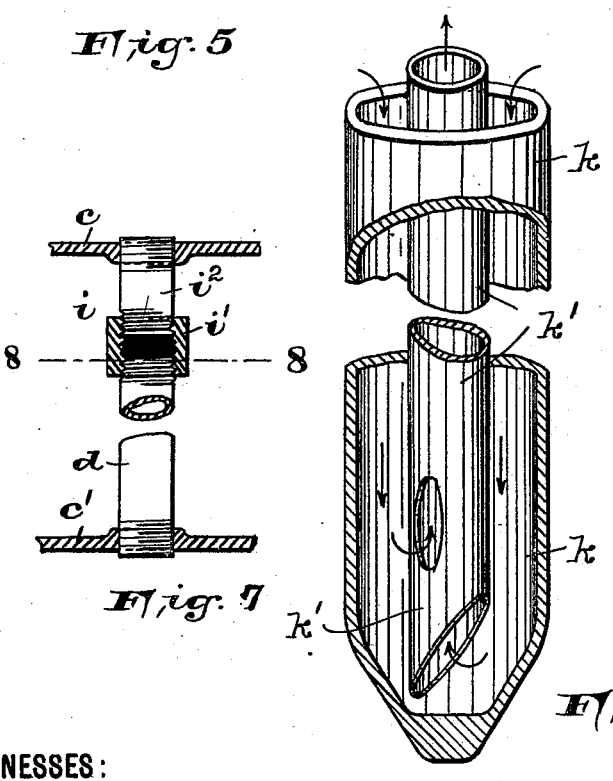
Fig. 9
Fig. 8
WITNESSES:
Wm. H. Canfield Jr.
H. N. Marsh
INVENTOR:
Edward R. Soleau
BY Fred C. Fraentzel, ATT'Y.

UNITED STATES PATENT OFFICE.

EDWARD R. SOLEAU, OF NEWARK, NEW JERSEY, ASSIGNOR OF ONE-HALF TO J. MILLER ROE, OF SAME PLACE.

HEATING APPARATUS.

SPECIFICATION forming part of Letters Patent No. 511,280, dated December 19, 1893.

Application filed June 29, 1893. Serial No. 479,122. (No model.)

*To all whom it may concern:*

Be it known that I, EDWARD R. SOLEAU, a citizen of the United States, residing at Newark, in the county of Essex and State of New Jersey, have invented certain new and useful Improvements in Heating Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel form of water heater for house-warming purposes, and has for its object to provide a heater, which shall be of a simple and economical construction, and one in which the water with which the apparatus is first filled is used over and over again, the only loss being due to slight evaporation.

My invention therefore consists in the improvements hereinafter described and finally embodied in the clauses of the claim.

The invention also consists in novel features in the construction of the upper and lower water-heating sections, especially adapted for expansion, when heated, and the arrangement and construction of the connecting pipes between them, for the purposes of hastening the heating process and causing an increased circulation of hot water.

Figure 1:
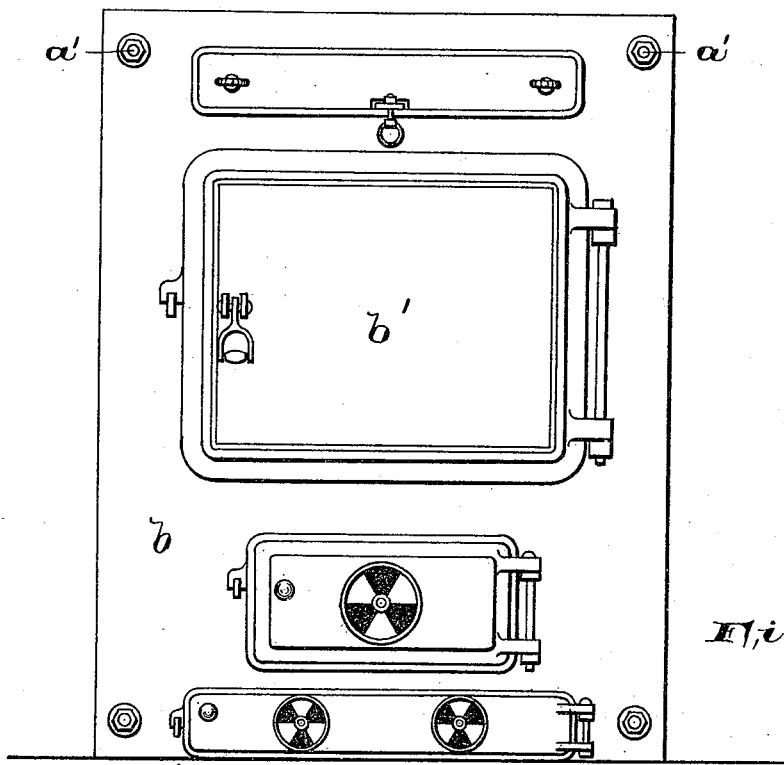
Figure 2:
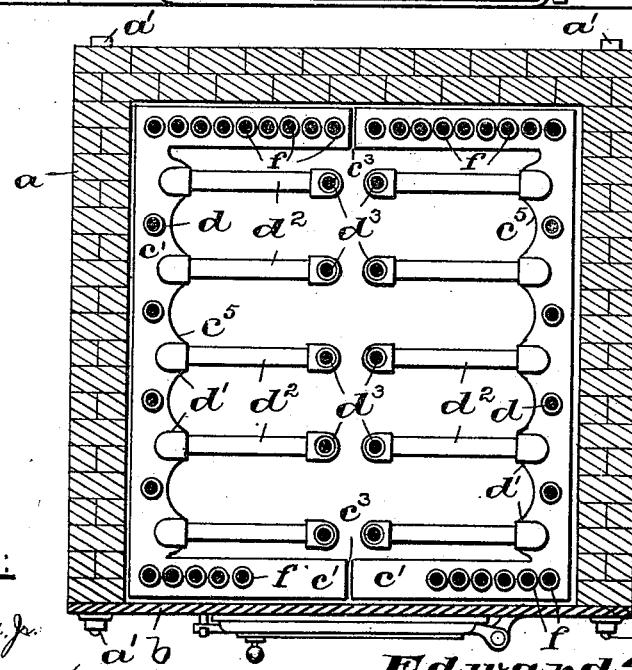

In the drawings herewith accompanying, in which like letters of reference are employed to indicate corresponding parts,—Figure 1 is a front view of my novel form of hot water heater. Fig. 2 is a horizontal section of the same, taken on line 2—2, in Fig. 4. Fig. 3 is a top view of the heater, the inclosing brick wall and front plate being represented in horizontal section; and Fig. 4 is a vertical section of the boiler, taken on line 4—4 in said Fig. 3. Fig. 5 is a horizontal section of the two upper sections, taken on line 5—5 in Fig. 4, and Fig. 6 is a top or plan view of the two lower sections. Fig. 7 is a detail view of the pipe connections between said upper and lower sections, and Fig. 8 is a horizontal section of the same, taken on line 8—8 in said Fig. 7. Fig. 9 is a detail view of one of the drop or pendent tubes and a circulating pipe arranged therein.

I preferably construct my novel form of water heater in a rectangular form, as shown in the drawings, within a suitable setting of brick, preferably provided at the front with an iron front-plate.

In the drawings, $a$ is the brick wall, which as will be seen from the drawings, forms the back and sides of the heater, and $b$ is a suitable iron front plate. Said plate $b$ is provided with the usual form of doors or openings, and is secured to the front of the said wall $a$ by suitable anchor bolts $a'$, as will be seen from Figs. 1 and 3, whereby, the said front plate can be easily and quickly removed when it is desired to clean or repair the heating apparatus within the brick wall.

In the construction of water heaters of this class, I have found that the upper sections $c$ and the lower sections $c'$ had to be of such large capacity that they were difficult to cast. I overcome this, by placing two sections $c$ side by side, and two sections $c'$ side by side, leaving the intervening spaces $c^2$ and $c^3$ respectively, as will be noticed from Figs. 5 and 6, thereby also procuring a greater freedom of expansion of said sections and causing the water to heat more rapidly.

As will be seen from Fig. 4, $g$ is the ash-pit, and within said ash pit, I place the lower sections $c$ which are ⊏ ⊐-shaped, as will be seen from Figs. 2 and 6, said sections being independent of the brick wall $a$ and being supported by any suitable number of legs $c^4$. Said lower sections $c$ are preferably of a corrugated shape, as at $c^5$ and are provided with suitable openings or holes $c^6$ at the sides, which are staggered as shown, and with suitable holes $c^7$ at the back and front. Within said holes $c^6$ are secured the ends of suitable vertical pipes or tubes $d$, while in the holes $c^7$, I secure the vertical pipes $f$ at the front and back, and in the holes formed just above the corrugations of said sections $c'$ I secure the pipes $d'$, which extend vertically for a short distance and are then formed with an inclined portion $d^2$, at an angle to the grate $h$. Said inclined portions $d^2$, extend to near the middle of the heater, as shown in Figs. 2 and 4, and are provided with the upright pipes or tubes $d^3$, substantially as shown in said Fig. 4. The upper sections $c, c$, which are provided with suitable holes or openings $c^8$ are supported on the free ends of said tubes or pipes $d, d^3$ and $f$, by means of suitable expansion joints $i$, see Figs. 7 and 8, which consist essentially of a collar $i'$ screwed upon the upper and free ends of said pipes $d, d^3$ and $f$, and screwed into said collar $i'$ is a union $i^2$ which is tapped into the holes $c^8$ in the bottom of said upper water-heating sections $c$ and $c'$. Depending from the lower surface of said sections $c, c$, are the drop or pendent tubes $k$, which, as will be seen from Fig. 4, project down to near said inclined tubes $d^2$ and are closed at the bottom, as shown. Within each of said tubes $k$, is arranged a circulating tube or pipe $k'$ which is open at the bottom as shown in Fig. 9. Said tube $k'$ projects above the top edge of said drop tube $k$ whereby a circulation of the water within the section $c$ will be caused in the direction of arrows shown in said Fig. 9, through the tube $k$, thence through the openings in the bottom of the tube $k'$ through said tube $k'$ and back into the section $c$. By this arrangement, it will be seen that a free and quick circulation of the water is caused, thereby becoming a valuable auxiliary water heater and circulator, the cooler water being taken from the bottom of the upper sections $c$ down to just above the fire and being returned many degrees hotter. As will be seen from Figs. 3 and 5, said upper sections $c, c$, are provided with any suitable number of smoke holes $c^9$, through which the smoke and gases from the fire escape to the smoke-stack, connected with the heater. Said smoke-holes may be closed or opened by means of a suitable damper $j$ operated by a rod $j'$, the operation of which will be clearly understood from said Fig. 3. Said sections $c, c$, are provided with suitable outlet openings $c^{10}$ to which are connected the ends of the outlet pipes $l$ and $l'$, which communicate with a pipe $l^2$ leading through the building; the return of the water from the building to the heater is made to the lower sections $c', c'$, by means of a pipe $m$, from which extend the branches $m'$ and $m^2$, which are tapped into said sections $c', c'$, at the back of the heater, as will be clearly seen from Fig. 6. Many advantages result from the use of the said sections $c, c$, and $c', c'$, instead of one large section, in that the parts can be more conveniently handled, and replaced, in case they should become disabled, the disabled section being quickly removed without disturbing the general arrangement and construction of the heater.

One great advantage is derived by the arrangement of the tubes or pipes $d^2$ and $d^3$, which, as will be seen from Figs. 2 and 4, run to the center of the heater, and whereby a better circulation and supply of water to all parts of the sections $c, c$, are the results. If these tubes or pipes were not arranged in this manner the result would be, that the circulation of water is along the edges of the sections $c$, and some of the drop tubes would not be supplied with water, which causes them to burn out very rapidly. By my improved arrangement of the pipes, as herein stated this is not the result, all drop tubes being at all times equally filled with water and hence they cannot burn out.

By the arrangement of the removable front plate $b$, said plate can be quickly taken off, and the whole inside apparatus is exposed to view and can be removed from its brick casing, without tearing down any of the brick work.

By the arrangement of any number of suitable doors or openings, in the front plate $b$, the ashes can be removed, fresh coal can be placed on the fire, and by the arrangement of the large door $b'$, the heating apparatus can be inspected at any time.

The heating apparatus herein shown is well adapted for steam heating purposes. All that is necessary, however, in that case, is to increase the capacity of said sections $c, c$, and $c', c'$, by making them of greater depth.

Of course it will be evident, that I can place any number of sections $c, c$ and $c', c'$, side by side, to increase the heating capacity of the heater, said sections being arranged in a series of pairs.

Having thus described my invention, what I claim is—

1. In a heating apparatus, in combination, the lower ⌷-shaped hollow sections $c', c'$, arranged to form a space $c^3$ between them, and provided with corrugations $c^5$, upper sections $c, c$, arranged to form a space $c^2$ between them, and connecting pipes or tubes connecting said lower sections with said upper sections, substantially as and for the purposes set forth.

2. In a heating apparatus, in combination, lower sections $c', c'$, arranged to form a space $c^3$ between them, upper sections $c, c$, arranged to form a space $c^2$ between them, pipes $d$, and $f$ connecting said sections, as set forth, pipes $d'$ and pipes $d^2$ connected with said pipes $d'$ and arranged at an angle to the horizontal plane of said lower sections, and pipes $d^3$ connecting the ends of said pipes $d^2$ with the said upper sections, substantially as and for the purposes set forth.

3. In a heating apparatus, in combination, lower sections $c', c'$, provided with return tubes $m'$ and $m^2$ connected with a pipe $m$, upper sections $c, c$, provided on the top with outlet tubes $l$ and $l'$, connected with a pipe $l^2$, and pipes or tubes connecting said lower sections with said upper sections, substantially as and for the purposes set forth.

4. In a heating apparatus, in combination, lower sections $c', c'$, provided with return tubes $m'$ and $m^2$ connected with a pipe $m$, upper sections $c, c$, provided on the top with outlet tubes $l$ and $l'$, connected with a pipe $l^2$, and pipes or tubes connecting said lower sections with said upper sections, comprising therein the vertical pipes $d$ and $f$, connecting said sections, as set forth, and the pipes $d'$ in said lower sections, pipes $d^2$ connected with said pipes $d'$ arranged at an angle to the horizontal plane of said lower sections, and pipes $d^3$ connecting the ends of said pipes $d^2$ with said upper sections, substantially as and for the purposes set forth.

5. In a heating apparatus of the class described, hollow sections $c'$, $c'$, arranged side by side, hollow sections $c$, $c$, also arranged side by side, a series of vertical tubes $d$ connecting said sections $c'$, $c'$ with said sections $c$, $c$, and a series of angularly shaped tubes, connecting said sections $c'$, $c'$, with said sections $c$, $c$, at or near their approximately abutting edges, substantially as and for the purposes set forth.

6. In a heating apparatus of the class described, in combination, with a setting $a$, ⊏⊐-shaped hollow sections $c'$, $c'$, hollow sections $c$, $c$, vertical tubes connecting said sections, and inclined tubes connecting the longest sides of said ⊏⊐-shaped sections $c'$, $c'$, with the approximately abutting edges of said sections $c$, $c$, substantially as and for the purposes set forth.

7. In a heating apparatus of the class described, in combination, with a setting $a$, ⊏⊐-shaped hollow sections $c'$, $c'$, hollow sections $c$, $c$, vertical tubes connecting said sections, and inclined tubes connecting the longest sides of said ⊏⊐-shaped sections $c'$, $c'$, with the approximately abutting edges of said sections $c$, $c$, and drop-tubes depending from said sections $c$, $c$, substantially as and for the purposes set forth.

8. In a heating apparatus of the class described, the combination, with ⊏⊐-shaped sections $c'$, $c'$, arranged to form a space $c^3$ between them, vertical pipes $d$, vertical pipes $d'$, inclined pipes $d^2$ connected with said pipes $d'$, and vertical pipes on said inclined pipes, sections $c$, $c$, arranged side by side to form a space $c^2$ between them, and said pipes $d^3$ extending into the edges of said sections $c$, $c$, near said spaces $c^2$, whereby direct communication is established between the sides of the heating apparatus at the bottom, and the middle of the heating apparatus at the top.

In testimony that I claim the invention set forth above I have hereunto set my hand this 26th day of June, 1893.

EDWARD R. SOLEAU.

Witnesses:
FREDK. C. FRAENTZEL,
WM. H. CAMFIELD, Jr.